United States Patent [19]
Fujioka et al.

[11] Patent Number: 4,509,084
[45] Date of Patent: Apr. 2, 1985

[54] ROTARY MAGNETIC HEAD

[75] Inventors: Yoshiharu Fujioka, Yamato; Akio Onuki, Ichikawa; Tomio Sakamoto, Yokosuka, all of Japan

[73] Assignee: Tokyo Shibaura Denki Kabushiki Kaisha, Kawasaki, Japan

[21] Appl. No.: 373,105

[22] Filed: Apr. 29, 1982

[30] Foreign Application Priority Data

May 11, 1981 [JP] Japan .................................. 56-70490
Sep. 1, 1981 [JP] Japan ................................. 56-137241

[51] Int. Cl.³ ............................................... G11B 5/08
[52] U.S. Cl. ..................................... 360/84; 360/107; 360/110
[58] Field of Search ................... 360/110, 119, 84, 107

[56] References Cited
U.S. PATENT DOCUMENTS
3,422,230 1/1969 Tanigawa ........................ 360/84 X Primary Examiner—A. J. Heinz
Attorney, Agent, or Firm—Oblon, Fisher, Spivak, McClelland & Maier

[57] ABSTRACT

In a rotary magnetic head according to the present invention, a rotor core provided with head cores for a pair of magnetic heads and a rotary side core of a rotary transformer is formed by joining a pair of rotor core halves formed of a starting material of one type of magnetic material or of the composite configuration formed by joining in advance different magnetic materials through a joining layer of predetermined length between the joining end faces thereof. The cores of the respective magnetic heads are provided at both ends of the joining end faces, and the central axis of the rotation of the rotor core is so defined equidistantly from both the magnetic heads and to pass the center of the length of the joining layer. The cores of the rotary transformer are provided coaxially with the central axis of the rotating shaft, and the rotor core is provided with a centering hole for aligning the central axis of the rotating shaft coaxially with the rotating shaft by engaging the rotating shaft for driving the rotary magnetic head.

8 Claims, 20 Drawing Figures

F I G. 5A
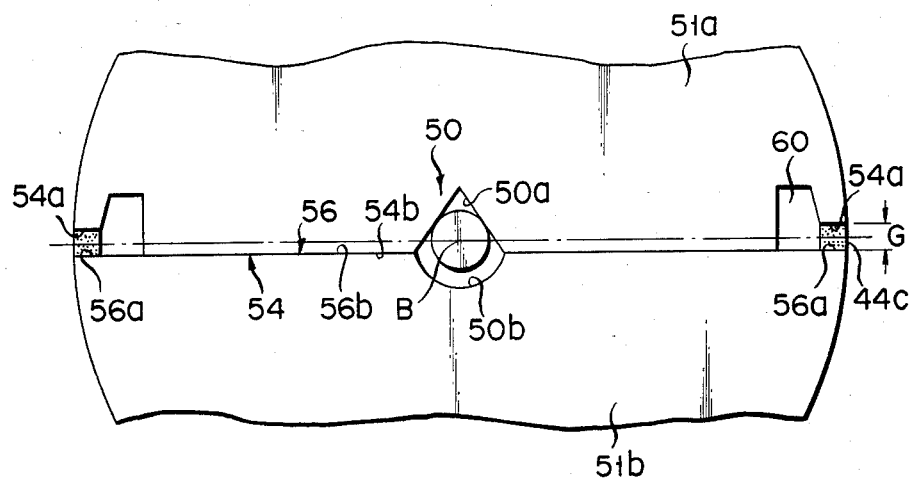
F I G. 6
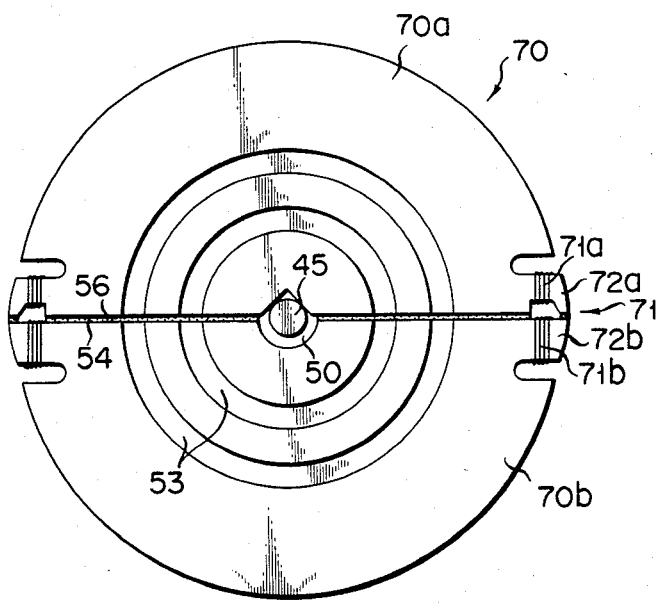

ROTARY MAGNETIC HEAD

BACKGROUND OF THE INVENTION

The present invention relates to a rotary magnetic head which comprises a pair of cylinders facing with an interval and forming a chamber therebetween; a rotating shaft projecting substantially coaxially with cylinders into the cylinders; a rotor having a pair of magnetic heads having a gap of predetermined length at the end thereof and mounted on shaft in the chamber of the cylinders; and a rotary transformer for coupling the magnetic heads to an external circuit.

A rotary magnetic head of the aforementioned type is already used in a video tape recorder and hence a VTR widely. In the VTR in general, a magnetic tape is fed obliquely on the outer peripheral surface of cylinders, and records and reproduces an electric signal while slidably moving with the magnetic head feeding along the surfaces of the cylinders while rotating. This scanning type is normally called "a helical scanning type", and the VTR employing this scanning type is excellent, but as the VTRs prevail, it is further desired to unveil a VTR which can further record and reproduce for longer time with light weight. For that purpose, it is desired to propose a rotary magnetic head having a small size, e.g., less than 50 mm in diameter and high accuracy as well as an adaptability for a mass production.

In order to clarify the features of the rotary magnetic head according to the present invention, a conventional rotary magnetic head will be first described. FIGS. 1 through 3 show the essential part of the conventional rotary magnetic head. A rotary magnetic head 20 has upper and lower cylinders 21 and 22, a slit 23 formed between the cylinders 21 and 22, and a magnetic tape (not shown) is fed slidably with the outer peripheries of the cylinders 21 and 22. A chamber 24 is formed between the cylinders 21 and 22, a rotating shaft 25 coupled with an external unit (not shown) is journaled with the lower cylinder 22 to extend into the chamber 24, and a rotor 26 is mounted at the extending part. The rotor 26 has a head base 27, magnetic heads 28, a mounting member 30 for mounting the magnetic heads 28 at the head base 27, and a rotary unit 32 for a rotary transformer 31. The magnetic heads 28 are so mounted substantially at equal distance from the center of axis of the rotating shaft 25 with the ends directed outwardly on a rectilinear line passing through the center of axis of the shaft 25.

FIG. 3 shows the magnetic heads 28. The magnetic heads 28 have a head core 28c bonded with a gap 33 of prescribed length G of head core halves 28a and 28b (FIG. 3), and head coils 28d are wound on the head core 28c.

As shown in FIG. 1, a rotary side core 32a forming the rotary unit 32 of the rotary transformer 31 and as shown in FIG. 2 two rotary side coils 32b are mounted at the head base 27, and a stationary side core 34a forming a stationary unit 34 of the rotary transformer 31 and two stationary side coils 34b are mounted inside the upper cylinder 21.

A magnetic tape (not shown) is fed along both the cylinders 21 and 22 in a spiral form, and the magnetic heads 28 are driven by the shaft 25 and are rotated. The ends of the magnetic heads 28 having a gap 33 are projected slightly from the slit 23, are slidably contacted with the magnetic tape while rotating, the magnetic heads 28 are coupled to an external circuit (not shown) through the rotary transformer 31 and thus reads and-/or writes a signal.

Since the rotary magnetic head thus constructed is mainly used for a VTR, it is so fabricated as to has a small size, high accuracy and high performance. That is, the machining accuracy and assembling accuracy of the respective parts forming the rotary magnetic head are required to be remarkably high.

The following matters are required particularly for the assembled rotary magnetic head:

That is, (1) the magnetic heads 28 are disposed substantially at 180° away from each other (it is required in an error to be within 1') with respect to the axial line of the shaft 25 particularly at the gap 33 formed therebetween, are spaced substantially at equal distance from the axial line, and the depth of the gap 33 projected from both the cylinders 21 and 22 should be substantially equal, and (2) the rotary side core 32a, stationary side core 34a and the rotary side coil 32b, stationary side coil 34b of the rotary transformer 31 are coaxially disposed substantially with respect to the rotating shaft 25. It was, however, difficult to produce the rotary magnetic head of the conventional configuration in mass production while sufficiently satisfying the aforementioned various requirements. Because the rotor 26 should be fabricated by assembling the head base 27, the magnetic heads 28, the mounting member 30 and the rotary unit 32a separately manufactured to obtain the prescribed requirements. It is accordingly necessary to fabricate separately precisely the many parts and to accurately couple the parts so as to satisfy the above described requirements. The magnetic heads 28 of the many parts forming the rotary magnetic head 20 normally have 2 to 3 mm of lateral and longitudinal sizes and less than 1 mm of thickness of small size and highly precise accuracy as required, and are also limited strictly at the mounting error even when they are assembled with other members. Such small parts are delicate, it is not only necessary to pay special attention in their transportation and positioning, but also needed to carefully take care of machining and associating so as not to cause a deformation and/or damage. For the purpose of machining and assembling such parts as ready as possible, small-size and high accuracy machining jig and tool as well as assembling jig and tool including a microscope are normally employed, but even when such jig and tool are used, the positioning of the rotary side core 32 of the rotary transformer 31 and the adjustment of the interval of the gap 33 of the head cores 28c are delicate, and are not easy and are necessary to depend much upon skilled technicians to perform the works. Accordingly, the rotary magnetic head 20 employing the rotor 26 of the conventional type shown in FIGS. 1 through 3 is not proper for the mass production.

SUMMARY OF THE INVENTION

It is an object of the present invention to provide a rotary magnetic head of the construction adapted for the ready and accurate assembly and of small size for responding to the aforementioned desires.

In order to achieve the above object, there is employed a rotor which has the following features in the rotary magnetic head according to the present invention. The features of the rotary magnetic head are such that the rotor has a rotor core comprised of two rotor core halves which are butted on each other, which have joining end faces facing each other and which form magnetic head cores each having a predetermined gap defining between the end portions of facing surfaces of the rotor core halves; rotor core halves are provided at both ends of the joining end faces with head core halves functioning as a core for the magnetic heads and head base halves functioning as a core of the rotary side of the rotary transformer, centering means comprised of a pair of grooves cut respectively in the joining end faces of the head base halves for receiving the rotating shaft so that the axis of the rotating shaft lies substantially at the mid point between the outer tips of the head core halves and in the plane partitioning the gaps provided at the end portions of the rotor core halves each into two equal parts, and two semi-circular grooves formed on said head base halves substantially coaxially with the center of rotation of said rotor for holding the rotary side coil of said rotary transformer.

Since the rotary magnetic head according to the present invention has the aforementioned features, the rotor core is formed by joining a pair of rotor core halves, and the machining to be performed with high accuracy can be concentrated to each rotor core half of integral structure. Thus, the relative positional relationship between the parts to be machined and the parts themselves can be precisely maintained. When the rotor core halves are formed of a starting material made of one type of magnetic material used commonly for the rotary side core of the transformer as the core of the magnetic heads or a starting material having composite structure formed by joining in advance the magnetic material adapted for the rotary side core and the magnetic material adapted for the core of the magnetic heads, the step of directly or indirectly joining the rotary unit of the rotary transformer and the magnetic heads as in the conventional rotary magnetic head can be omitted. Accordingly, the manufacturing steps can be simplified, and there can be obtained a rotor of small size and high accuracy and hence the rotary magnetic head of small size and high accuracy. These points will be described with reference to later preferred embodiments in greater detail. Furthermore, if positioning means for defining the respective mounting angle positions with respect to the rotating shaft for driving the rotary magnetic head are provided at the rotor core of the rotary magnetic head having a pair of magnetic head, and if a plurality of such rotary magnetic heads are mounted to the shaft, with a desired magnetic head interval, then a multi-stage rotary magnetic head capable of reproducing excellent image in the slow motion reproduction of the VTR can be provided.

BRIEF DESCRIPTION OF THE DRAWINGS

FIG. 5A is a plan view showing a main portion of another rotor of the rotary magnetic head;

FIG. 6 is a plan view of another preferred embodiment of the rotor used in the rotary magnetic head different from the rotor shown in FIG. 5;

DETAILED DESCRIPTION OF THE PREFERRED EMBODIMENTS

The present invention will now be described in more detail with reference to the accompanying drawings.

Figure 1:
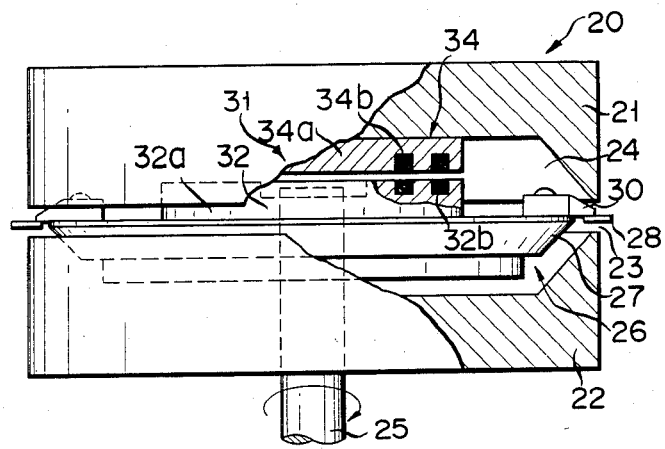
FIG. 1 is a partial sectional front view of a conventional rotary magnetic head.
Figure 2:
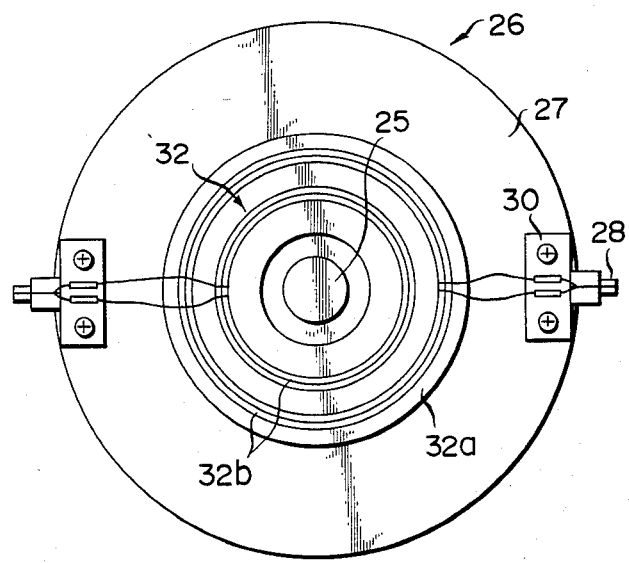
FIG. 2 is a plan view of a rotor used for the rotary magnetic head in FIG. 1.
Figure 3:
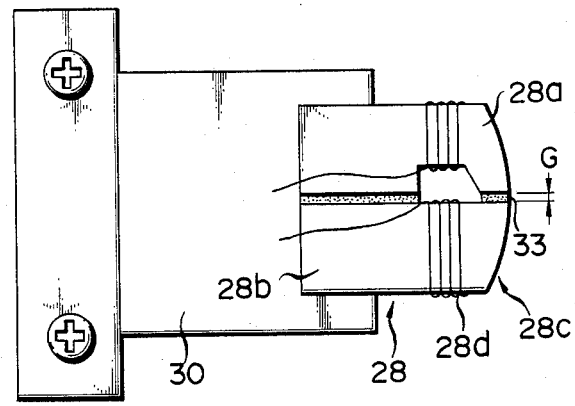
FIG. 3 is an enlarged plan view of the magnetic head shown in FIG. 2.
Figure 5:
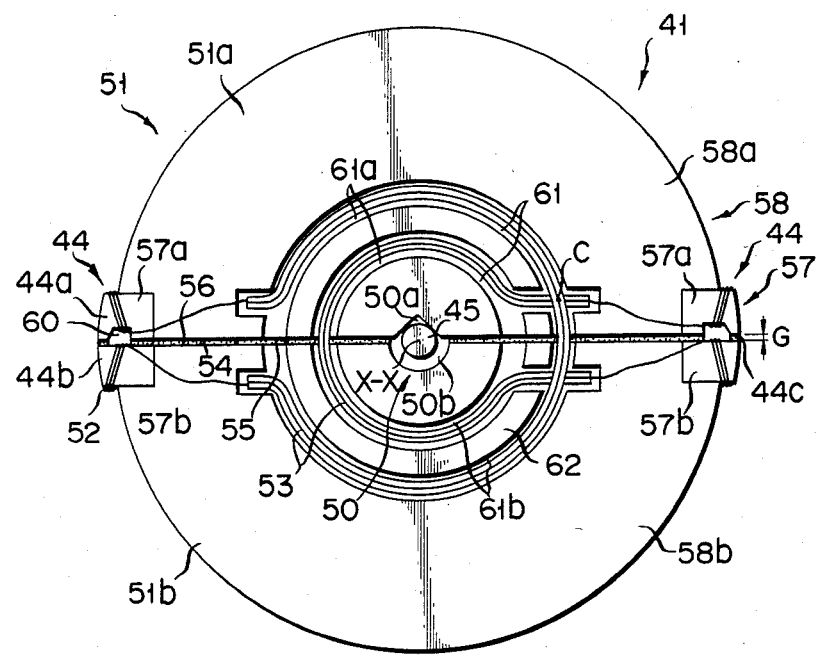
FIG. 5 is a plan view of the rotor used in the rotary magnetic head in FIG. 4.
Figure 4:
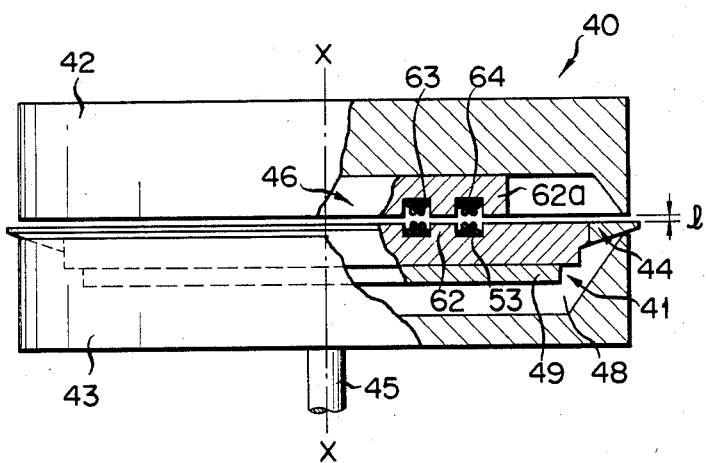
FIG. 4 is a partial sectional front view of a rotary magnetic head according to the present invention.

FIG. 4 is a partial sectional front view of the rotary magnetic head 40 according to the present invention, and FIG. 5 is a view or the rotor 41 and the rotating shaft 45 used for the rotary magnetic head 40 as seen from above in FIG. 4. As shown in FIG. 4, the rotary magnetic head 40 comprises an upper cylinder 42, a lower cylinder 43, a rotating shaft 45, a rotor 41, two magnetic heads 44, and a rotary transformer 46. The upper and lower cylinders 42 and 43 normally formed of aluminum or aluminum alloy are coaxially disposed and spaced for a distance l, and a chamber 48 is formed between the cylinders 42 and 43. The rotating shaft 45 journaled by the lower cylinder 43 extends into the chamber 48 coaxially with the cylinders 42 and 43, is engaged with a mounting plate 49 in the chamber 48, and is mounted at the upwardly extending end with the rotor 41. The rotating shaft 45 and the rotor 41 are coaxially aligned by centering means or a centering hole 50 provided at the rotor 41, and the rotor 41 is secured by the known method, e.g., a screw clamping or the like to the mounting plate 49 in the above described state. The center of rotation of the rotor 41 and the axis of rotation of the rotating shaft 45 thus aligned are together represented by X—X in FIG. 4.

As shown in FIGS. 4 and 5, the rotor 41 has a disk-shaped rotor core 51 formed by butt joining semi-circular rotor core halves 51a and 51b, a head coil 52 for the magnetic heads 44, and a rotary side coil 53 of the rotary transformer 46. The axes of rotation of the rotor 41, rotor core 51 and rotor core halves 51a and 51b coincides with the axis of the shaft 45 as designated by X—X. The rotor core halves 51a and 51b are substantially semi-circular planar members having joining end faces 54 and 56 as seen substantially rectilinearly in FIG. 5 in such a manner that the joining end faces 54 and 56 are faced and are joined through a joining layer 55 having the same interval as the gap formed at the ends of the magnetic head 44. The centering means and accordingly the centering hole 50 are formed through the central portion of the rotor core 51. The hole 50 is formed of a notch 50a of isosceles triangular shape formed at the rotor core half 51a and a notch 50b of semi-circular shape formed at the rotor core half 51b. When the rotating shaft 45 is inserted, as shown in FIG. 5, into the positioning hole 50 and is engaged with the notch 50a, the axis of the shaft 45 coincides with the axis of rotation of the rotor core 51. The notch 50a is so machined in shape that the axis of the shaft 45 engaged with the notch 50a and accordingly the axis X—X of rotation of the rotor core halves 51a and 51b passes the center of the width of the joining layer 55 and is equidistantly located from the gap 44c of both the magnetic heads 44.

The rotor core halves 51a and 51b both shown in FIG. 5 are so positioned that their joining end faces 54 and 56 are spaced for a distance equal to the gap. Instead, as shown in FIG. 5A, they may be so formed that their joining end faces 54 and 56 may contact each other except for both end portions where said gap is provided. More specifically, the rotor core half 51b has a flat joining end face 56a, and the rotor core half 51a has a stepped surface consisting of a face 54a which is spaced from the face 56a for a distance equal to gap G and another face 54b which contacts the face 56b. A V-notch 50a cut in the face 54b and a semi-circular notch 50b cut in the face 56b define a centering hole 50. When the shaft 45 is received in the hole 50, its axis extends through point B. As shown in FIG. 5A, point B lines substantially halfway between gaps 44c provided at the ends of the joining end faces 54 and 56 when the rotor core halves 51a and 51b are put together. Further, point B is located in the V-notch 50a, about half the gap 44c from the joining end face 54b. In other words, point B lies in the plane which partitions either gap 44c into two equal parts.

Also in other embodiments which will later be described, the same rotor core halves as used in the embodiment of FIG. 5A are used. Nonetheless, the rotor core 51 of these embodiments is illustrated in such way as in FIG. 5, thereby to simplify the drawings.

The rotor core half 51a has a head core half 57a and a head base half 58a joined with the half 57a, both of which are made of magnetic material, and the rotor core half 51b has a head core half 57b and head base half 58b, both of which are made of magnetic material. The head core halves 57a are provided substantially equidistantly from the axis X—X of rotation of the rotor core halves 51a at both ends of the joining end face 54, and the head core halves 57b are provided substantially equidistantly from the axis X—X of rotation of the rotor core half 51b and the axis of rotation of the rotor core half 51b at the same distance as the case of the rotor core 51a at both ends of the joining end face 56. The head core halves 57a are formed with recesses 60 on which head coils 52 are wound, the head base halves 58a are formed with notches 50a of isosceles triangular shape as a part of the centering hole 50, and the wide semi-circular surface is formed with two semi-circular grooves 61a around the center of the axis X—X of rotation of the rotor core half 51a. Further, the head base halves 58b are formed with the notches 50b of semi-circular shape, and the wide semi-circular surface is formed with two semi-circular grooves 61b having the same radius as the grooves 61a around the center of the axis X—X of rotation of the rotor core half 51b.

When the rotor core halves 51a and 51b thus fabricated as described above are joined through the joining layer 55, the head core halves 57a and 57b form the head core 57 for the magnetic head, the head base halves 58a and 58b form the head base 58 operating as a rotary side magnetic unit 62 of the rotary transformer 46, and the notches 50a and 50b form the centering hole 50. The notch 50b operates as a clearance for readily inserting the rotating shaft 45 into the centering hole 50.

Since the rotor core halves 51a and 51b are machined, in case as shown in FIG. 5, in the state that the head base halves are joined integrally with the head core halves, respectively, the joining end faces, the magnetic heads, the centering hole, and the semi-circular grooves, etc. can be thus precisely and readily machined. The semi-circular grooves 61a and 61b of these components may also be machined or formed, for example, by an etching process or the like after they are joined to form the rotor core 51.

When the rotary transformer 46 is formed, the rotary side coil 53 is provided at the circular grooves 61 (which are formed of semi-circular grooves 61a and 61b) of the rotor core 51, and the stationary side coil 64 may be prevented at the circular groove 63 formed to be faced with the rotary side coil 53 at the stationary side magnetic unit which is mounted under the upper cylinder 42 to be faced with the rotary side magnetic unit. The rotary side coil 53 of the rotary transformer 46 thus formed is connected to the magnetic head 44, and the stationary side coil 64 is connected to an external device (not shown). The rotary side magnetic unit 62 and the rotary side coil 53 thus formed a rotary unit of the rotary transformer 46, and the stationary side magnetic unit 62a and the stationary side coil 64 form the stationary unit of the rotary transformer 46.

A pair of rotary side coils 53 provided at the head base 58 (which is formed of the head base halves 58a and 58b) are formed of electric conductor, e.g., gold, copper, etc., and the intersection C of both the coils with a space therebetween is insulated by an electrically insulating film (not shown) e.g. made of silicon dioxide or aluminum oxide. The coil 53 may be formed by the known technique of matters of common knowledge, e.g., a metallic evaporation technique, printing technique, etc.

The head base 58 and the head core 57 forming the rotor core 51 may be, as shown in FIGS. 4 and 5, formed of different magnetic materials from each another, or formed of the same magnetic material. When they are formed of different materials, the head core 57 is formed of a material which has high wear resistance and high magnetic permeability, e.g., single crystalline ferrite, Sendust (trade name), and the head base 58 is formed of a material, e.g., relatively inexpensive polycrystalline ferrite, Permalloy (trade name). When they are formed of the same material, the overall rotor core 51 is desired to be formed of a material, e.g., single crystalline or polycrystalline ferrite, Sendust series materials.

When the head base 58 and the head core 57 are formed of different materials, the head base halves and the head core halves are first joined integrally, the member of the composite structure thus joined is machined as prescribed, and the rotor core halves 51a and 51b thus formed are joined to form the rotor core 51.

When the composite structure is joined and both the rotor core bodies 51a and 51b are joined, a glass melting process, a bonding process using an organic adhesive material or sintering method under high temperature and high pressure may be employed. When the head base 58 and the head core 57 are formed of the same material, the rotor core halves 51a and 51b may be formed of one block member made of the same material, and in this case, the joining step of the head base halves and the head core halves can be omitted, but the rotor core halves 51a and 51b may be joined in the same manner as described above by a glass melting process, a bonding method using the organic adhesive material.

Even in the rotary magnetic head 40 thus formed by employing the rotor 41 formed as described above, (a) the gaps of the two magnetic heads 44 are disposed substantially 180° apart with each other around the axis X—X or the rotating shaft 45, (b) the magnetic heads are disposed substantially equidistantly from the axis X—X of rotation, (c) the rotary unit of the rotary transformer 46 is formed substantially coaxially with the axis X—X of rotation, and (d) the angle, the distance and the coaxial property should be highly precisely performed in the same manner as the conventional rotary magnetic head.

Since the rotary magnetic head 40 according to the present invention employs the rotor 41 of the construction thus formed as described above, it has smaller size and higher performance than the conventional rotary magnetic head and can be fabricated easily. These features and the advantages of the rotary magnetic head 40 of the present invention are provided by (1) the rotor core 51 is formed of the two rotor core halves 51a and 51b to be joined later, both the rotor core halves 51a and 51b are individually precisely machined and are joined, and the requirements described in the above paragraphs (a), (b), (c) and (d) can be readily satisfied, and (2) the rotor core halves 51a and 51b are formed of the first member made of one type of magnetic material or the second member of the composite structure formed by joining integrally the plural magnetic materials in advance at the prescribed position as the starting material, thereby reducing the size. The reduction of the size of the rotary magnetic head described in the above paragraph (2) can be performed because it is not necessary to fabricate unnecessarily largely the components which should be small in size in the functions and which are individually machined heretofore and are joined thereafter by employing the first or the second member, and when the cores for the magnetic heads and the members for the rotary transformer core individually fabricated are assembled, necessary conventional parts can be omitted.

Further, the rotor core 51 which satisfies the requirements described in the above paragraphs (a), (b), (c) and (d) can be advantageously precisely fabricated according to the present invention since the work is ready because the rotor core halves 51a and 51b are formed by machining the first or the second member which is relatively large and can be readily machined, the portions to be highly precisely machined can be readily machined and can also be highly precisely relatively disposed, because the parts to be highly precisely machined, such as, the centering hole 50, the magnetic heads 44, e.g., the slidably contacting surfaces 44a, 44b of the magnetic heads 44, the circular grooves 61 of the rotary transformer 46 are gathered to the rotor core halves, and the step of joining the cores for the magnetic head and the rotary transformer with each other or with the other member, which step is difficult to raise the accuracy and also difficult to increase the production efficiency can be omitted.

In the rotary magnetic head according to the present invention, the rotor core halves 51a and 51b are joined, but since the rotor core halves 51a and 51b of relatively large size are joined in such a manner that the joining end faces 54 and 56 of relatively long side are joined in a parallel arrangement, they can be highly precisely joined.

FIG. 6 shows another preferred embodiment of the rotor core different from the rotor core shown in FIG. 5. The rotor core 70 shown in FIG. 6 is formed by joining a pair of rotor core halves 70a and 70b made of one type of magnetic material, and has a substantially circular profile. A centering hole 50 to be engaged with the rotating shaft 45 is formed in the same manner as the rotor core 51 shown in FIG. 5 at the central portion of the rotor core 70. Head cores 71 formed of head core halves 71a and 71b are formed at both ends of the joining end faces 54 and 56 of the rotor core halves 70a and 70b. The slidably contacting surfaces of the head core halves 71a and 71b with a magnetic tape have excellent wear resistance property and are joined with slidably contacting members 72a and 72b formed of a material having nominal characteristic values of high magnetic permeability and high magnetic flux density, and the other parts thereof are formed of a material having high magnetic permeability.

Figure 7:
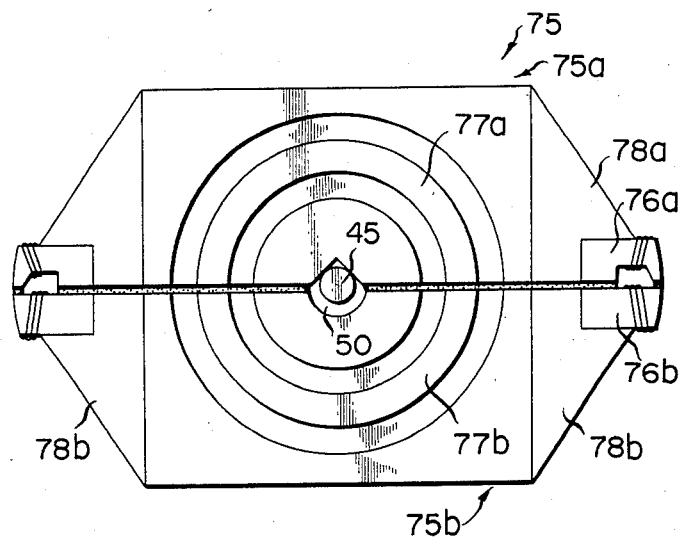
FIG. 7 is a plan view of still another preferred embodiment of the rotor used in the rotary magnetic head different from the rotors shown in FIGS. 5 and 6.

FIG. 7 shows still another preferred embodiment of the rotor different from the rotors shown in FIGS. 5 and 6. The rotor core 75 shown in FIG. 7 is formed of rotor core halves 75a and 75b made of members of composite structure. The rotor core halves 75a and 75b are formed of head core halves 76a and 76b made of a material adapted to the cores of a magnetic head, and triangular nonmagnetic halves 78a and 78b disposed between the core halves 77a and 77b of the rotary transformer and the core halves 75a and 75b of the magnetic heads for coupling both. In this case, the nonmagnetic halves 78a and 78b are effective to reduce the crosstalk between a pair of the above magnetic heads when the rotor core 75 is associated within the rotary magnetic head.

According to the rotary magnetic head according to the present invention, a process which is difficult to raise the accuracy, e.g., bonding or the like is reduced as described above by precisely determining the size of the shape of the parts to be machined of the rotor core halves and the relative positional relationship of the portions to be machined mainly in accordance with the mechanical machining. Consequently, the rotary magnetic head according to the present invention can be highly precisely formed and can be produced in a mass production line.

Figure 8:
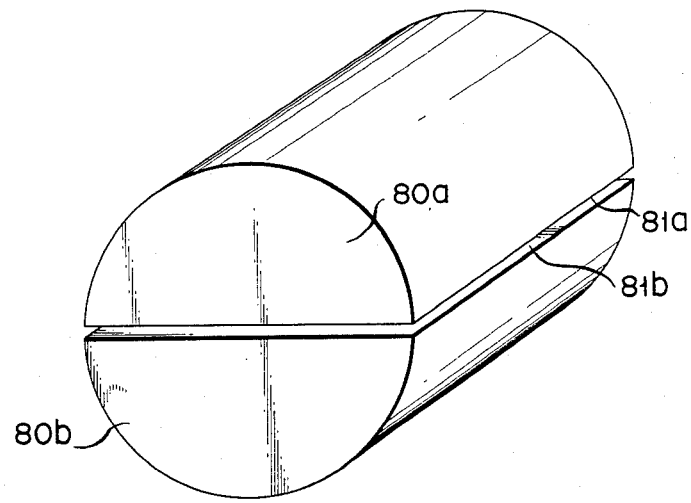
FIG. 8 is a perspective explanatory view of the starting material used when fabricating the rotor core shown in FIG. 5.

The fabricating steps of the rotor 41 shown in FIGS. 4 and 5 used for the rotary magnetic head according to the present invention will be generally described with reference to FIGS. 8 through 10. As shown in FIG. 8, a round rod of the same diameter and material as the head base 58 is fabricated, is then cut at a plane including the longitudinal axis and hence the axis of the shaft, and thus two semi-circular cross sectional rods 80a and 80b are obtained.

Figure 9:
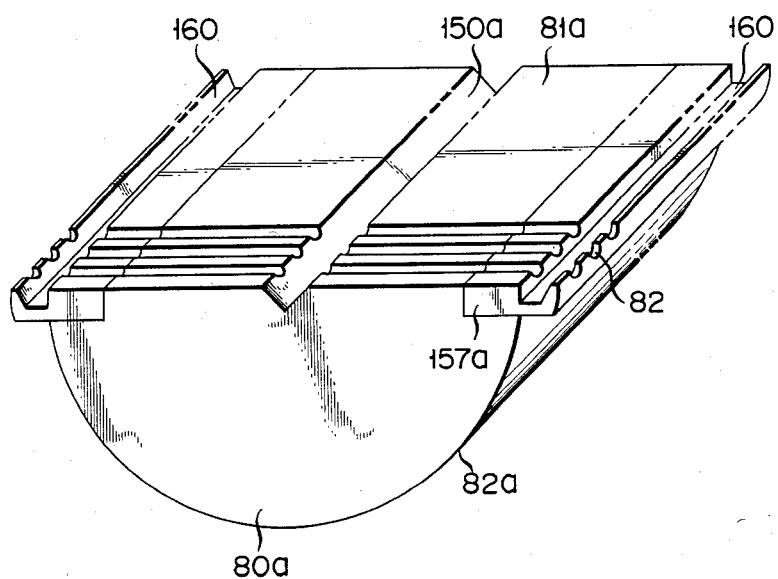
FIG. 9 is a view showing the halved part of the starting material shown in FIG. 8.

FIG. 9 shows the rod 80a disposed upside down from the position in FIG. 8 and finished with the machining steps which will be described below. Subsequently, a head core rod 157a having substantially rectangular cross section made of a magnetic material which form the head core half 57a of the magnetic head later is joined to the stepped part formed at the edge of each of both ends at which the outer peripheral surface 82a of the rod 80a in FIG. 9 and the cut face 81a intersect. Then, the surface of the head core rod 157a and the cut face are mirror finished and a long groove 160 to form later a recess 60 for the head coil and a long groove 150a to form later an isosceles triangular notch 50a for the centering hole 50 are axially formed on the cut face 81a. This machining step is carried out under the same attentions as those described with reference to the rotor core 51 shown in FIGS. 4 and 5, e.g., the long grooves 150a are formed equidistantly from a pair of the ends each end of which defines a gap 44c later.

A number of grooves 82 formed substantially perpendicularly to the axis of the shaft on the cut face 81a in FIG. 9 are grooves for forming the gap width at the end of the head core 57 formed later so as to be corresponded to the width of prescribed tracks.

A head core rod 157b is joined to the semi-circular cross sectional rod 80b (in FIG. 10) in the same manner as the rod 80a, and then mirror finished with the rod 80b. Then, long grooves 150b to form later the semi-circular grooves 50b for the centering hole 50 are formed substantially equidistantly from the end of the head core rod 157b.

Figure 10:
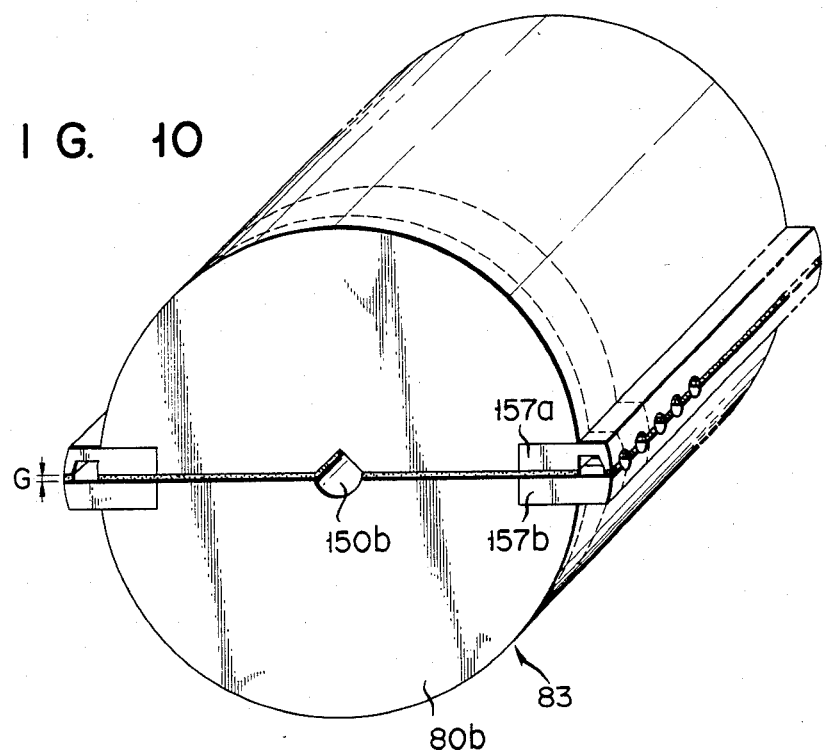
FIG. 10 is a view showing the joined state of the halves.

A pair of semi-circular cross sectional rods 80a and 80b thus formed with various grooves as described above are joined with a predetermined length G of a gap 44c as shown in FIG. 10. A spacer made of e.g. a non-magnetic material is inserted in the gap 44c. This joining is normally carried out by a glass melting process. The cylindrical block 83 formed of two rods 80a and 80b to be joined later is cut separately by a plane shown with a broken line of FIG. 10 to the circular disk-shaped member. The circular disk-shaped member thus separated corresponds to the rotor core 51 in FIG. 5 is treated with a shape correction process. The circular grooves 61 as seen in FIG. 5 may be formed, for example, by an etching process after the separation. Thereafter, the head coil 52 is wound in the recess 60 (in FIG. 5) of the head core 57, and the rotary side coil 53 of the rotary transformer 46 is provided in the circular grooves 61. According to the method described heretofore as shown in FIGS. 9 and 10, the rotor core 51 and hence the rotor 41 can be readily and highly precisely fabricated.

Although preferred various examples of the rotor used for the rotary magnetic head according to the present invention are designated in FIGS. 4 through 7, the present invention is not limited only to the particular embodiments and examples, but various other changes and modifications may be made within the spirit and scope of the present invention as will be further described mainly below.

Figure 11:
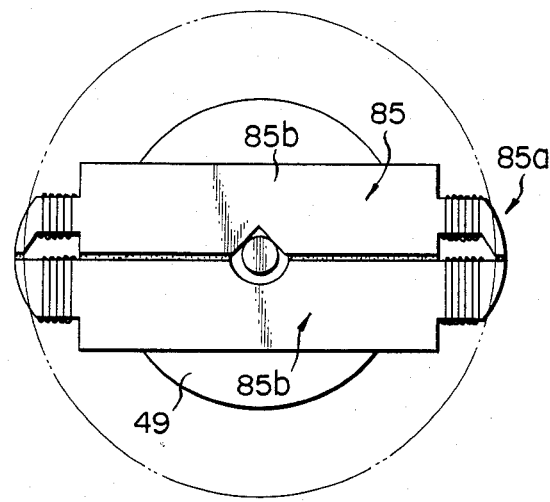
FIGS. 11 through 13 are plan views of still another preferred embodiments of the rotor.
Figure 12:
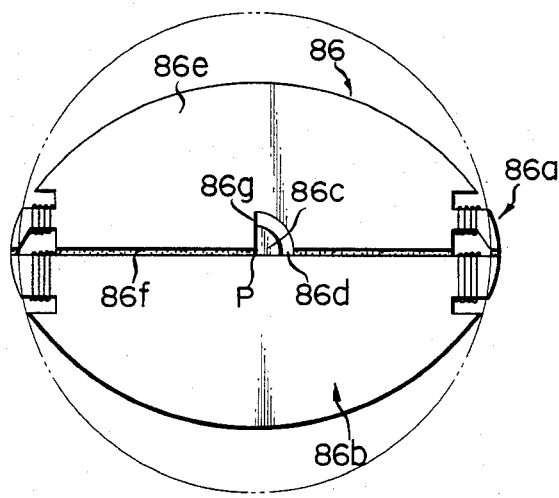
Figure 13:
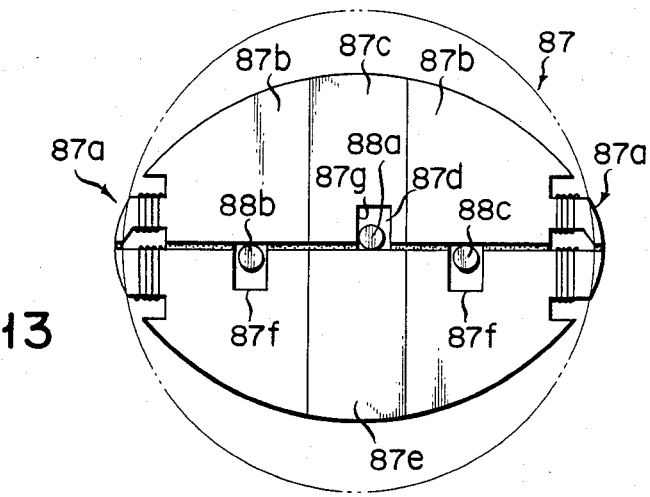

A rotor core 85 of the rotor shown in FIG. 11 is of the type formed of a magnetic material. This rotor is different from the rotor shown in FIGS. 4 and 5 at the point that the head base 85b to be joined with the head core 85a is formed in rectangular shape. The circular part designated by reference numeral 49 is formed the same as the mounting plate shown in FIG. 4, and the rotor core 85 is mounted on the circular part. The circle designated by two-dotted chain lines shown in FIGS. 11 through 13 show an outer surfaces of the upper cylinder 42 and/or lower cylinder 43. The circle designated by two-dotted chain lines shown below are the same as that shown in FIG. 11.

A rotor shown in FIG. 12 is different from the rotor shown in FIGS. 4 through 11 at the points that the head cores 86a are provided at both ends of the head bases 86b of spinning spool shape defined by a part of the circular or a part of a elliptical curve, and that a method of centering the rotor and the rotating shaft is different from those shown in FIGS. 4 through 11. In FIG. 12, the rotating shaft on which the rotor is mounted is formed in a sector 86c with 90° of the angle of the vertex, and a sector groove 86d of the angle of the vertex larger than 90° of the sector 86c is formed from the joining end face 86f of the rotor core half 86e. The radial part 86g of the sector groove 86d is formed at a right angle at the joining end face 86f through the center of both the ends of the head cores 86a and hence the center P of rotation of the rotor. When the rotor core 86 is engaged with the rotating shaft so that the two radii forming a right angle of the sector 86c of the rotating shaft and the sector groove 86d are in a coincident state, respectively, the rotor core 86 and the rotating shaft are aligned with each another. Then, the rotor core 86 is secured to the mounting plate 49 as in FIG. 4.

A rotor core 87 of the rotor shown in FIG. 13 has substantially equal shape to the rotor core in FIG. 12, but a separator 87c made of glass, ceramic or nonmagnetic metal is provided between the magnetic heads 87a, thereby preventing the crosstalk between the magnetic heads 87a, and a different method of centering the rotor from those of the previous examples and a different method of positioning the angular position of the rotor are employed in comparison with the previous rotor cores heretofore described. A rectangular groove 87d notched substantially at a right angle is formed on the joining end face of the rotor core half 87c, and two rectangular grooves 87f notched substantially at a right angle is formed on the joining end face of the rotor core half 87e. One rectilinear part 87g forming the longitudinal groove 87d is so formed as to pass the center of rotation of the rotor core 87. Pins 88a, 88b, and 88c are stood on the mounting plate 49 (in FIG. 4) for mounting the rotor, and are so formed that, when the pin 88a is contacted with the rectilinear part 87g of the groove 87d and the joining end face of the rotor core half 87b is contacted with the pins 88b, 88c, the axis of rotation of the rotor 87 coincides with the center of the axis of the rotating shaft 45 (in FIG. 4). The rotor is mounted on the mounting plate 49 (in FIG. 4) in this state.

In the rotary magnetic head described with reference to FIGS. 4 through 13, the rotor having a pair of magnetic heads disposed substantially at 180° separately from one another is employed, but there is a case that a plurality pairs of magnetic heads are necessarily mounted on the same rotating shaft. In a rotary magnetic head, for example, having a pair of magnetic heads are used, when a video reproduction is carried out in a slow motion by a VTR, it tends to cause the deterioration or defect of a signal due to the displacement of the tracing locus of the magnetic head and the signal track. Accordingly, a plurality pairs of magnetic heads are mounted on the rotating shaft to be displaced at a prescribed angle therebetween, the deterioration of the reproduced video image can be avoided in combination of the signals from the magnetic heads thus mounted. This arrangements are effective, but with this arrangement it is necessary to precisely maintain a predetermined mounting interval of a plurality pairs of the magnetic heads.

The rotor of the structure described below enables the ready mounting of a plurality of rotors having a pair of magnetic heads on one rotating shaft spaced at a predetermined angle. A structure of such rotor according to the present invention will be described below.

Figure 14:
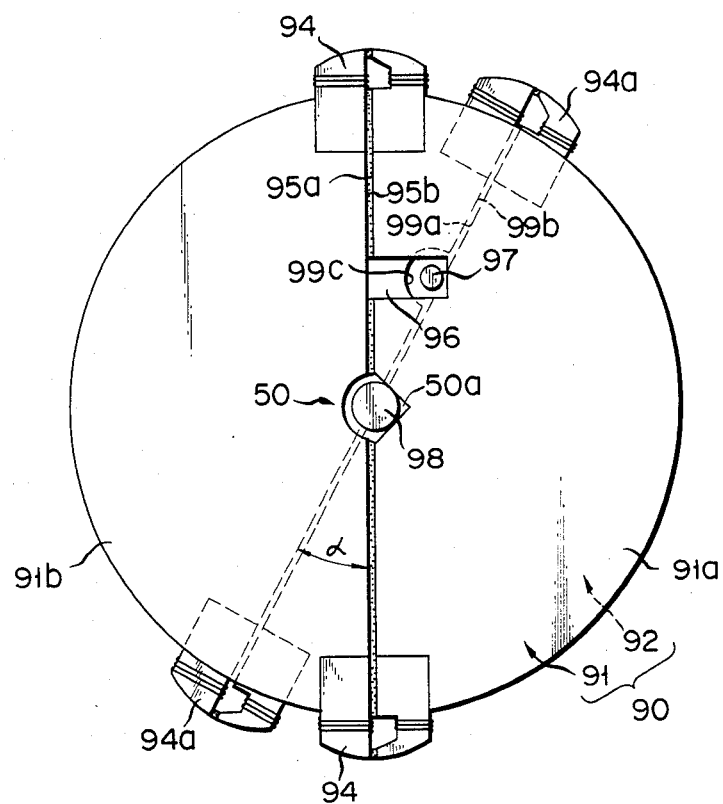
FIG. 14 is a plan view of the double stack rotary magnetic rotor.
Figure 15:
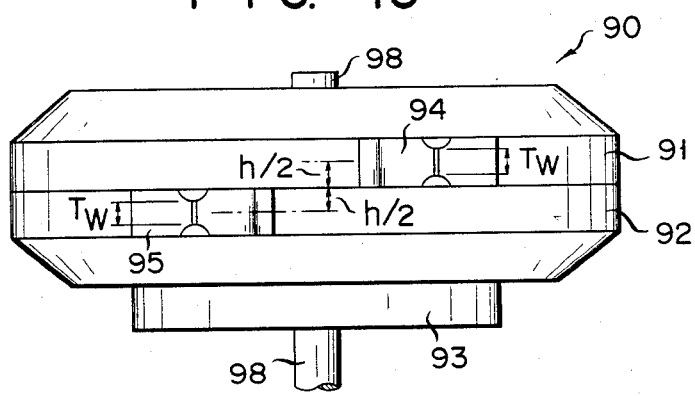
FIG. 15 is a front view of the rotary magnetic rotor in FIG. 14.

A rotor shown in FIGS. 14 and 15 is formed by engaging two rotors 91 and 92 on the rotating shaft 98, which will be hereinafter called "a double stack rotor 90", and which will be described as "a single rotor", when the rotors 91 and 92 should be individually described. The single rotors 91 and 92 are formed substantially equal to the rotor 41 as described with reference to FIG. 5, and since only the difference therebetween exists in the arrangement that positioning means for defining the mounting angle positions of both the single rotors 91 and 92 is provided, the description except the positioning means will be omitted for the convenience of simplicity.

FIG. 14 shows the stacked state of the single rotors 91 and 92. Two magnetic heads 94 are for the upper single rotor 91, and two magnetic heads 94a are for the lower single rotor 92. The single rotor 91 is formed by joining the rotor halves 91a and 91b at the joining end faces 95a and 95b, and a centering hole 50 shown in FIG. 5 is formed at the central portion. A rectangular groove 96 is formed substantially at a right angle with respect to the end face 95a from the joining end face 95a on the rotor half 91a. A mounting plate 93 (in FIG. 15) is secured to the rotating shaft 98, and a pin 97 (in FIG. 14) is stood on the mounting plate 93. The groove 96 is so disposed that the pin 97 is engaged with the groove 96 when the single rotor 91 is engaged with the shaft 98 and the single rotor 91 is rotated until the pin 97 makes contact with the right end of the groove 96 to be stopped when the single rotor 91 is rotated counterclockwise while the shaft 50 is engaged with the isosceles triangular notch 50a of the centering hole 50. The single rotor 91 and hence the magnetic head 94 is positioned with respect to the rotating direction as described above and is then clamped with screw or other suitable means to the mounting plate 93.

The single rotor 92 shown in FIG. 14 is substantially hidden under the single rotor 91 except a part of the magnetic head 94a, and the joining end faces 99a and 99b are illustrated by broken lines. A centering hole 50 is formed at the center of the single rotor 92 in the same manner as the case of the single rotor 91, but is omitted in FIG. 14 for the simplicity of the disclosure of FIG. 14. In the case of this single rotor 92, special machining is not executed on the joining end face 99a, but a semicircular groove 99c is formed on the joining end face 99b. This groove 99c is so formed on the end face 99b that, when the single rotor 92 is engaged with the rotating shaft 98, the pin 57 is advanced into the groove 99c. When the single rotor 92 is rotated counterclockwise while the shaft 98 is engaged with the centering hole 50, the joining end face 99a is contacted with the pin 97, and the position of the single rotor 92 with respect to the rotating direction is defined by the pin 97. The single rotor 92 is secured to the mounting plate 93 at this time by suitable method, e.g., screw clamping or the like. Since the single rotors 91 and 92 are aligned coaxially via the centering hole 50 and are determined in the angular directions by the engagement of the pin 97 with the groove 96 and the engagement of the pin 97 with the joining end face 99a, and angular interval α between the single rotors 91 and 92 can be thus eventually determined. The angular difference of the single rotors can be readily determined without particular skillfulness when the dimensions of the related components are precisely fabricated. In FIG. 15, $T_W$ represents the width of the track of the magnetic head, and $h/2$ represents the distance between the end face of the single rotor and the center of the track width. It is very important to correctly determine the size $h/2$ so as to raise the performance of the rotary magnetic head according to the present invention.

Figure 16:
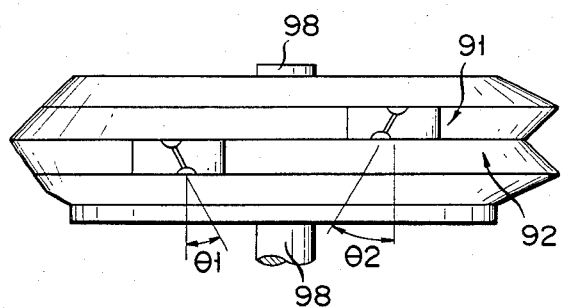
FIG. 16 is a front view showing another preferred embodiment of the double stack rotary magnetic head according to the present invention.

The rotor of double stack has been described for the rotary magnetic head according to the present invention, but instead of the rotor shown in FIGS. 14 and 15, various other modified examples can be fabricated. FIG. 16 shows a double stack rotor substantially similarly constructed to that in FIGS. 14 and 15, but formed different from that in FIGS. 14 and 15 at the point that the azimuth angles $\theta 1$ and $\theta 2$ of the single rotors 91 and 92 are different.

Figure 17:
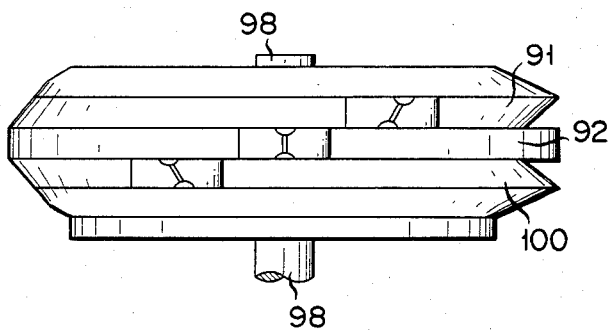
FIG. 17 is a front view showing a preferred embodiment of the three-stage stack rotary magnetic head according to the present invention.
Figure 18:
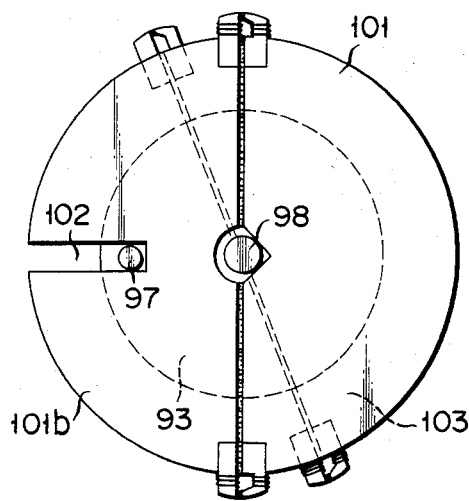
FIGS. 18 and 19 are plan views showing still another preferred embodiments of the double stack rotary magnetic heads according to the present invention.
Figure 19:
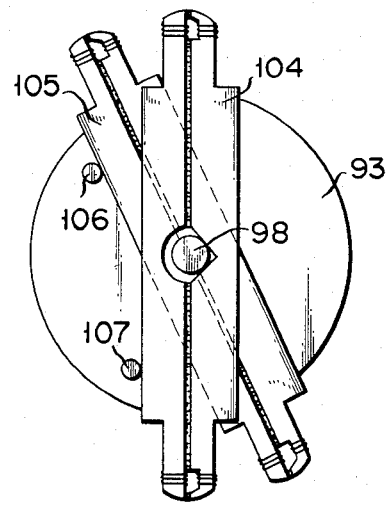

FIG. 17 shows a triple stack rotor formed of single rotors 91, 92 and 100 mounted on the rotating shaft 98. In this case, angular positions of the respective single rotors can be defined in the same manner as that described with respect to FIG. 14. FIG. 18 shows a method of positioning the single rotor 101 engaged with the rotating shaft 98 by the engagement of the pin 97 provided on the mounting plate 93 with the rectangular groove 102 notched on the outer periphery of the rotor half 101b. The lower single rotor 103 can be positioned at a predetermined relative angular position with respect to that of the single rotor 101 by the same manner. In this case, another rectangular groove (not shown) is notched on a suitable position of the lower single rotor 103. FIG. 19 shows single rotors 104 and 105 formed substantially in rectangular shape, the side faces of the rectangular parts of the single rotors are precisely machined, and two pins 106 and 107 are suitably stood at suitable positions on the mounting plate, and the angle between the adjacent magnetic heads of the single rotors 104 and 105 can be defined by engaging the side faces of the rotors and the pins, respectively.

What we claim is:

1. In a rotary magnetic head having a pair of cylinders disposed coaxially, facing each other and forming a chamber therebetween, a rotating shaft extending substantially coaxial with said cylinders into said cylinders, a rotor mounted on said shaft in the chamber and including a pair of magnetic heads each having a gap of a predetermined length at one end, and a rotary transformer for coupling said magnetic heads to an external circuit, the improvement in which said rotor comprises:

a rotor core comprised of core halves having joining end faces which face each other, said core halves having a central portion and end portions, said end portions being used as the core halves of said magnetic heads and having a gap of a predetermined width, the central portions of said core halves having joining surfaces and being used as head base halves, said central portions forming a rotor-side core of said rotary transformer; and centering means for centering the joining surfaces of said core halves, comprising an isosceles triangular notch cut in the joining surface of one of said head base halves, a bisector of the vertex angle of the isosciles traingular notch extending at right angles to the joining surface, and a semicircular notch cut in the joining surface of the other head base half, extending along the axis of said rotor, and having a radius larger than said rotating shaft, said centering means receiving the rotating shaft, holding the shaft in contact with the surface of the isosceles triangular notch and maintaining a clearance between the shaft and the semicircular notch so that an axis of the rotating shaft lies substantially at a midpoint between the outer tips of said head core halves and in a plane of the gaps between the end portions of said rotor core halves;

said rotor secured to said rotating shaft by means of a mounting plate secured to the rotating shaft; and two semicircular grooves cut in said head base halves, to define a circuit whose center is identical with the center of rotation of said rotor, and to hold a rotor-side coil of said rotary transformer.

2. A rotary magnetic head according to claim 1, wherein said rotor core halves comprise:

a magnetic material having substantially uniform characteristics.

3. A rotary magnetic head according to claim 2, comprising:

a pin stood on said mounting plate; and stopping means provided on said rotors for defining the angular position of said magnetic heads with the position of said pin as a reference in contact with said pin when said rotor rotates around said rotating shaft as a center, wherein the angle between said magnetic heads is defined at a predetermined value by coupling a plurality of rotors corresponding to a variety of angular positions for said mounting plate and said pin.

4. The rotary magnetic head according to claim 3, wherein said stopping means comprises:

a longitudinal groove formed substantially at a right angle from the joining end faces of one of said two rotor halves.

5. The rotary magnetic head according to claim 4, wherein said stopping means comprises:

a semi-circular groove formed with a radius larger than the diameter of said pin and formed on the joining end faces of one of said two rotor halves.

6. A rotary magnetic head according to claim 1, comprising:

a pin stood on said mounting plate; and stopping means provided on said rotors for defining the angular position of said magnetic heads with the position of said pin as a reference, said stopping means in contact with said pin when said rotor rotates around said rotating shaft as a center, wherein an angle between said magnetic heads is defined at a predetermined value by coupling a plurality of rotors corresponding to a variety of angular positions for said mounting plate and said pin.

7. The rotary magnetic head according to claim 6, wherein said stopping means comprises:

a longitudinal groove formed substantially at a right angle from the joining end faces of one of said two rotor halves.

8. The rotary magnetic head according to claim 6, wherein said stopping means comprises:

a semi-circular groove formed with a radius larger than the diameter of said pin and formed on the joining end faces of one of said two rotor halves.

* * * * *